United States Patent
Oka (10) Patent No.: US 7,426,022 B2
(45) Date of Patent: Sep. 16, 2008

(54) LIQUID CRYSTAL MODULE BRIGHTNESS MEASUREMENT APPARATUS AND BRIGHTNESS MEASUREMENT APPARATUS

(75) Inventor: Masaharu Oka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 11/604,283

(22) Filed: Nov. 27, 2006

(65) Prior Publication Data

US 2007/0132986 A1    Jun. 14, 2007

(30) Foreign Application Priority Data

Nov. 28, 2005    (JP) ............... 2005-342366

(51) Int. Cl.
  *G01J 1/42* (2006.01)
  *B23K 26/38* (2006.01)
  *G01B 7/00* (2006.01)

(52) U.S. Cl. ............. 356/218; 219/121.69; 219/121.82; 33/1 M; 33/559

(58) Field of Classification Search ............ 33/556, 33/558–559, 1 M, 503–505; 341/20; 219/121.69, 219/121.82, 121.83; 356/400–401, 615, 356/213, 218, 602; 250/548, 557, 561
  See application file for complete search history.

(56) References Cited

U.S. PATENT DOCUMENTS

| | | | |
|---|---|---|---|
| 4,721,388 A * | 1/1988 | Takagi et al. ............ | 356/602 |
| 4,838,696 A * | 6/1989 | Pryor ..................... | 356/602 |
| 5,171,963 A * | 12/1992 | Saruta et al. ........... | 219/121.69 |
| 5,194,743 A * | 3/1993 | Aoyama et al. ......... | 250/548 |
| 5,291,270 A * | 3/1994 | Koch et al. ............. | 356/602 |
| 5,333,386 A * | 8/1994 | Breyer et al. ........... | 33/1 M |
| 5,694,219 A * | 12/1997 | Kim ....................... | 356/615 |
| 6,067,165 A * | 5/2000 | Matsumiya et al. ..... | 356/401 |
| 6,158,136 A * | 12/2000 | Gotz et al. .............. | 33/503 |
| 6,163,973 A * | 12/2000 | Matsumiya et al. ..... | 33/559 |
| 6,232,616 B1 | 5/2001 | Chen et al. | |
| 6,590,643 B2 | 7/2003 | Kubota et al. | |
| 2005/0035311 A1 | 2/2005 | Asakawa et al. | |

FOREIGN PATENT DOCUMENTS

| | | |
|---|---|---|
| EP | 0 385 474 A2 | 9/1990 |
| JP | 63-246795 A | 10/1988 |
| JP | 7-35645 A | 2/1995 |
| JP | 07089741 A * | 4/1995 |
| JP | 11-218466 A | 8/1999 |
| JP | 2000-241292 A | 9/2000 |
| JP | 2001-281049 A | 10/2001 |

OTHER PUBLICATIONS

European Search Report dated Mar. 7, 2007 (Nine (9) pages).
Japanese Office Action dated Oct. 23, 2007 with English translation (four (4) pages).

* cited by examiner

*Primary Examiner*—Sang Nguyen
(74) *Attorney, Agent, or Firm*—Crowell & Moring LLP (57) ABSTRACT

A brightness measurement apparatus which includes a placement unit on which an object to be measured is placed, a measurement unit for measuring brightness or chromaticity from an upper surface of the object placed on the placement unit, a placement unit moving mechanism for moving the placement unit in an x-axis direction, and a measurement unit moving mechanism for moving the measurement unit in a y-axis direction orthogonal to the x-axis direction.

1 Claim, 6 Drawing Sheets

LIQUID CRYSTAL MODULE BRIGHTNESS MEASUREMENT APPARATUS AND BRIGHTNESS MEASUREMENT APPARATUS

BACKGROUND OF THE INVENTION

1. Field of the Invention

The present invention relates to a liquid crystal module brightness measurement apparatus and a brightness measurement apparatus.

2. Description of the Related Art

Conventionally, a brightness measurement apparatus for measuring the brightness, chromaticity, and the like of a liquid crystal module has been known for the purpose of, for example, the quality inspection and quality control of a liquid crystal module constituting a liquid crystal display.

Specifically, the brightness measurement apparatus comprises, for example, a placement unit on which a liquid crystal module is placed, and a measurement unit for measuring the brightness, chromaticity, and the like from an upper surface (display surface) of the liquid crystal module placed on the placement unit. The brightness measurement apparatus as described above is designed so that, for example, the position of the measurement unit is fixed and the placement unit is moved to move the liquid crystal module on the placement unit in the shorter side direction and the longer side direction. Thus, the brightness, chromaticity, and the like in the entire upper surface (display surface) of the liquid crystal module can be measured.

Along with the recent trend in liquid crystal displays having a larger size, a problem has been caused where a measurement apparatus for measuring predetermined measurement items for components constituting a liquid crystal display also requires a larger size.

Consequently, for example, a measurement apparatus which measures a twist angle, cell gap, and azimuth anchoring energy in the display surface of liquid crystal cells constituting a liquid crystal display, and does not require a larger size even when the liquid crystal cells have a larger size is disclosed (for example, see Patent Document 1).

Patent Document 1: Japanese Patent Laid-open Publication No. 2000-241292

Of course, the brightness measurement apparatus described above needs to increase in size as the liquid crystal displays become larger in sizes. In particular, in order to measure the entire upper surface (display surface) of the liquid crystal module placed on the placement unit, the brightness measurement apparatus needs to move the liquid crystal module in shorter side direction and longer side direction. Therefore, there is a problem where as the area of liquid crystal module increases, the setting area for the brightness measurement apparatus increases. To solve this problem, a method has been considered in which the placement unit is fixed while the measurement unit is moved in the shorter side direction and the longer side direction of the liquid crystal module placed on the placement unit. However, in order to realize the above-described measurement unit that can be moved in two directions of the shorter side direction and longer side direction of the liquid crystal module, for example, a part supporting the measurement unit must be stronger, which causes a problem of an increased cost in the brightness measurement apparatus.

SUMMARY OF THE INVENTION

An object of the present invention is to provide a liquid crystal module brightness measurement apparatus and a brightness measurement apparatus which can alleviate increase in the setting area and the cost which tend to increase as the size of the display apparatus such as a liquid crystal display and the like become larger.

In order to solve the above problem, in accordance with a first aspect of the present invention, a liquid crystal module brightness measurement apparatus comprises a first placement unit and a second placement unit on which a liquid crystal module is placed, and a measurement unit for measuring brightness and chromaticity from an upper surface of the liquid crystal module placed on the first placement unit or the second placement unit, a placement unit moving mechanism for moving the first placement unit in an x-axis direction, a placement unit rotating mechanism for rotating the second placement unit about a predetermined axis, and a measurement unit moving mechanism for moving the measurement unit in a y-axis direction orthogonal to the x-axis direction, wherein the x-axis direction is in same direction as a shorter side direction of the liquid crystal module placed on the first placement unit, the y-axis direction is in same direction as a longer side direction of the liquid crystal module placed on the first placement unit, and the predetermined axis is an axis extending along a placement surface of the second placement unit.

According to the first aspect of the present invention, the liquid crystal module brightness measurement apparatus comprises the first placement unit and second placement unit on which a liquid crystal module is placed, and a measurement unit for measuring the brightness and chromaticity from an upper surface of the liquid crystal module placed on the first placement unit or the second placement unit. The placement unit moving mechanism can move the first placement unit in the x-axis direction. The measurement unit moving mechanism can move the measurement unit in they-axis direction orthogonal to the x-axis direction. Here, the x-axis direction is in the same direction as the shorter side direction of the liquid crystal module placed on the first placement unit. The y-axis direction is in the same direction as the longer side direction of the liquid crystal module placed on the first placement unit.

Specifically, by moving the liquid crystal module placed on the first placement unit only in one direction (the shorter side direction of the liquid crystal module) and by moving the measurement unit only in one direction (the longer side direction of the liquid crystal module), the brightness and chromaticity of the entire upper surface of the liquid crystal module placed on the first placement unit can be measured. Therefore, both the liquid crystal module and the measurement unit are moved only in one direction. Thus, increase in the setting area and the cost associated with increase in size of a display apparatus such as a liquid crystal display and the like can be alleviated. Further, since the liquid crystal module placed on the first placement unit is moved along the shorter side direction of the liquid crystal module, when compared with a case where the liquid crystal module placed on the first placement unit is moved along the longer side direction of the liquid crystal module, the liquid crystal module can have a smaller moving range. Thus, increase in the setting area associated with increase in size of a display apparatus such as a liquid crystal display can be alleviated more.

Furthermore, the placement unit rotating mechanism can rotate the second placement unit about a predetermined axis. Thus, the brightness and chromaticity of the liquid crystal module can be measured not only in a direction orthogonal to the upper surface of the liquid crystal module placed on the second placement unit, but also in a direction oblique to the upper surface of the liquid crystal module. This can provide various measurements. Furthermore, the liquid crystal module placed on the second placement unit rotated only about the predetermined axis along the placement surface of the second placement unit. Thus, increase in the setting area of the brightness measurement apparatus can be alleviated even the second placement unit is provided.

In accordance with the second aspect of the present invention, a brightness measurement apparatus, comprising:

a placement unit on which an object to be measured is placed, a measurement unit for measuring brightness or chromaticity from an upper surface of the object placed on the placement unit, a placement unit moving mechanism for moving the placement unit in an x-axis direction, and a measurement unit moving mechanism for moving the measurement unit in a y-axis direction orthogonal to the x-axis direction.

According to the second aspect of the present invention, while a component constituting a display apparatus is an object to be measured, the brightness measurement apparatus comprises the placement unit on which the object to be measured is placed, and the measurement unit for measuring the brightness or chromaticity from the upper surface of the object to be measured placed on the placement unit. The placement unit moving mechanism can move the placement unit in the x-axis direction along the placement surface of the placement unit. The measurement unit moving mechanism can move the measurement unit in the y-axis direction which is orthogonal to the x-axis direction and extends along the placement surface of the placement unit.

Specifically, by moving the object placed on the placement unit only in one direction (x-axis direction) and by moving the measurement unit only in one direction (y-axis direction), the brightness or chromaticity of the entire upper surface of the object to be-measured placed on the placement unit can be measured. Therefore, the object to be measured as well as the measurement unit is moved only in one direction. Thus, increase in the setting area and the cost associated with increase in size of a display apparatus can be alleviated.

In addition, both the x-axis direction and y-axis direction are preferably parallel to a placement surface, when the placement unit has the placement surface to place the object to be measured. Further or alternatively, both the x-axis direction and y-axis direction are preferably parallel to a surface to be measured of the object placed on the placement unit. This is also applicable to the first aspect of the present invention.

Preferably, the x-axis direction is in same direction as a shorter side direction of the object placed on the placement unit, and the y-axis direction is in same direction as a longer side direction of the object placed on the placement unit.

In the present invention, the same effect is obtained. Further, the x-axis direction is in the same direction as the shorter side direction of the object to be measured placed on the placement unit. The y-axis direction is in the same direction as the longer side direction of the object to be measured placed on the placement unit. Specifically, the object to be measured placed on the placement unit is moved along the shorter side direction of the object. Therefore, when compared with a case where the object to be measured placed on the placement unit is moved along the longer side direction of the object, the object to be measured can have a smaller moving range. Thus, increase in the setting area associated with increase in size of a display apparatus can be alleviated more.

In addition, the placement unit preferably has position adjustment unit such as a position adjustment structure or position adjustment mark by which the object can be placed in a predetermined direction with respect to the placement surface. This is also applicable to the first aspect of the present invention.

Preferably, a placement unit rotating mechanism for rotating the placement unit about a predetermined axis, and the predetermined axis is an axis extending along a placement surface of the placement unit.

In the present invention, the same effect is obtained. Further, the placement unit rotating mechanism can rotate the placement unit about the predetermined axis. Thus, the brightness or chromaticity of the object to be measured can be measured not only in a direction orthogonal to the upper surface of the object placed on the placement unit, but also in a direction oblique to the upper surface of the object, thus providing various measurements. Furthermore, the object to be measured placed on the placement unit is rotated only about the predetermined axis along the placement surface of the placement unit. Thus, increase in the setting area of the brightness measurement apparatus can be alleviated even when the apparatus includes the second placement unit.

The above configuration is based on an assumption that both the x-axis direction and y-axis direction extend along the placement surface when the placement unit is set to fit to a fixed reference angle.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

PREFERRED EMBODIMENT OF THE INVENTION

Hereinafter, a description is given of an embodiment of the liquid crystal module brightness measurement apparatus (hereinafter referred to as a brightness measurement apparatus) according to the present invention in detail with reference to drawings. The scope of the invention is not limited to the illustrated examples.

Figure 1:
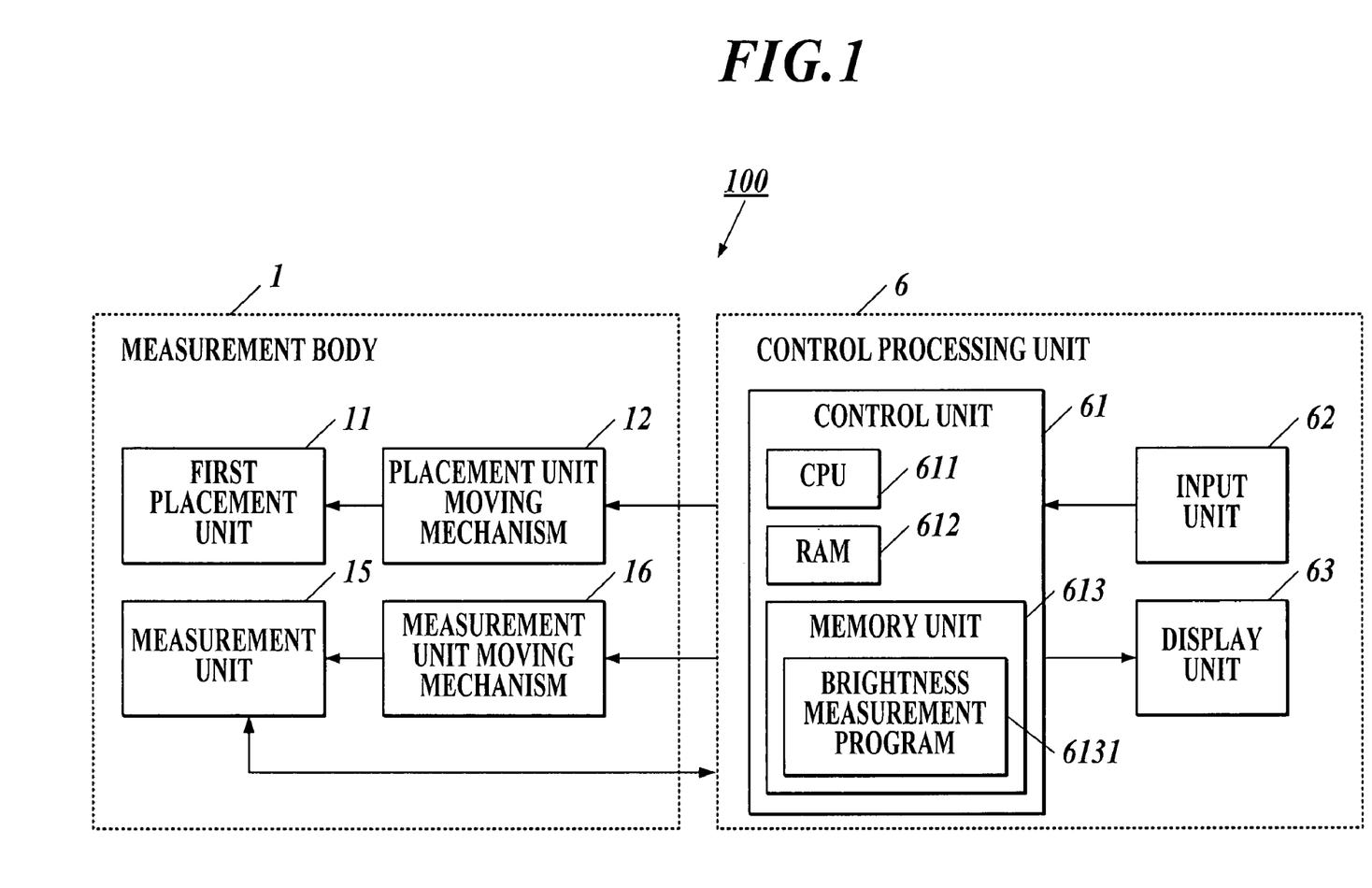
FIG. 1 is a block diagram illustrating a functional structure of a brightness measurement apparatus (liquid crystal module brightness measurement apparatus) according to the present invention.

As shown in FIG. 1, for example, a brightness measurement apparatus 100 comprises a measurement body 1 for measuring the brightness and chromaticity of a liquid crystal module M as an object to be measured, and a control processing unit 6 that controls the measurement body 1 and processes data obtained by the measurement body 1. The measurement body 1 is electrically connected with the control processing unit 6.

<Configuration of Measurement Body>

Figure 2:
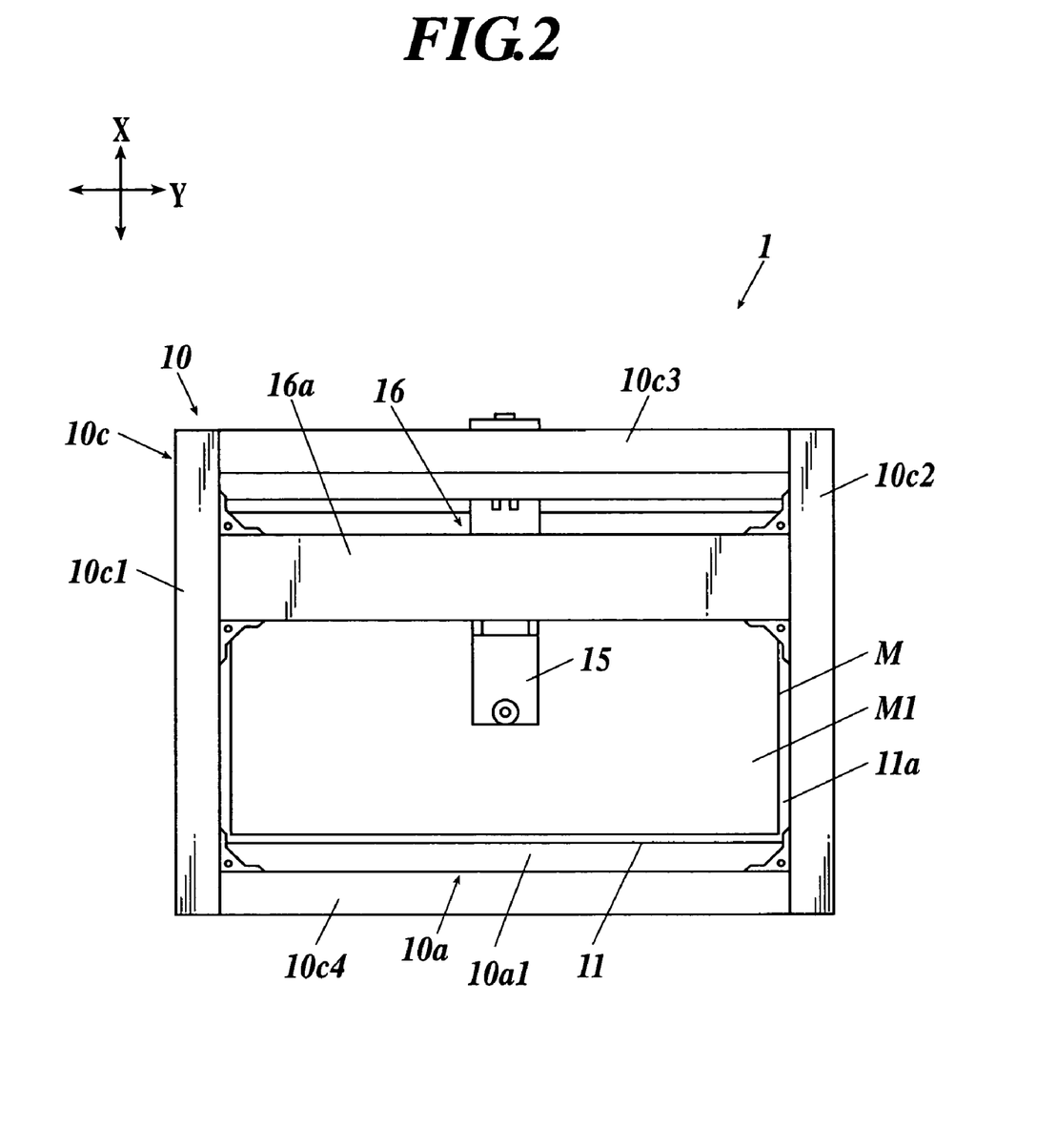
FIG. 2 is a plan view illustrating a liquid crystal module placed on the first placement unit of the brightness measurement apparatus (liquid crystal module brightness measurement apparatus) according to the present invention.

First, as shown in FIG. 2, for example, the shorter side direction of the upper surface of the measurement body 1 is assumed as an x-axis direction, and the longer side direction of the upper surface of the measurement body 1 is assumed as a y-axis direction. The x-axis direction and y-axis direction are orthogonal to each other. As shown in FIGS. 3 to 6, for example, a direction orthogonal to the x-axis direction and y-axis direction is assumed as a z-axis direction.

As shown in FIGS. 1 to 6, for example, the measurement body 1 comprises a frame 10, a first placement unit 11 on which a liquid crystal module M is placed, a placement unit moving mechanism 12 for moving the first placement unit 11 in the x-axis direction along the placement surface 11a of the first placement unit 11, a second placement unit 13 on which the liquid crystal module M is placed, a placement unit rotating mechanism 14 for rotating the second placement unit 13 about a predetermined axis A extending along a placement surface 13a of the second placement unit 13, a measurement unit 15 for measuring the brightness, chromaticity, and the like of the liquid crystal module M from an upper surface (display surface Ml) of the liquid crystal module M placed on the first placement unit 11 or the second placement unit 13, and a measurement unit moving mechanism 16 for moving the measurement unit 15 in the y-axis direction along the placement surface 11a of the first placement unit 11 and the placement surface 13a of the second placement unit 13, and the like.

Figure 5:
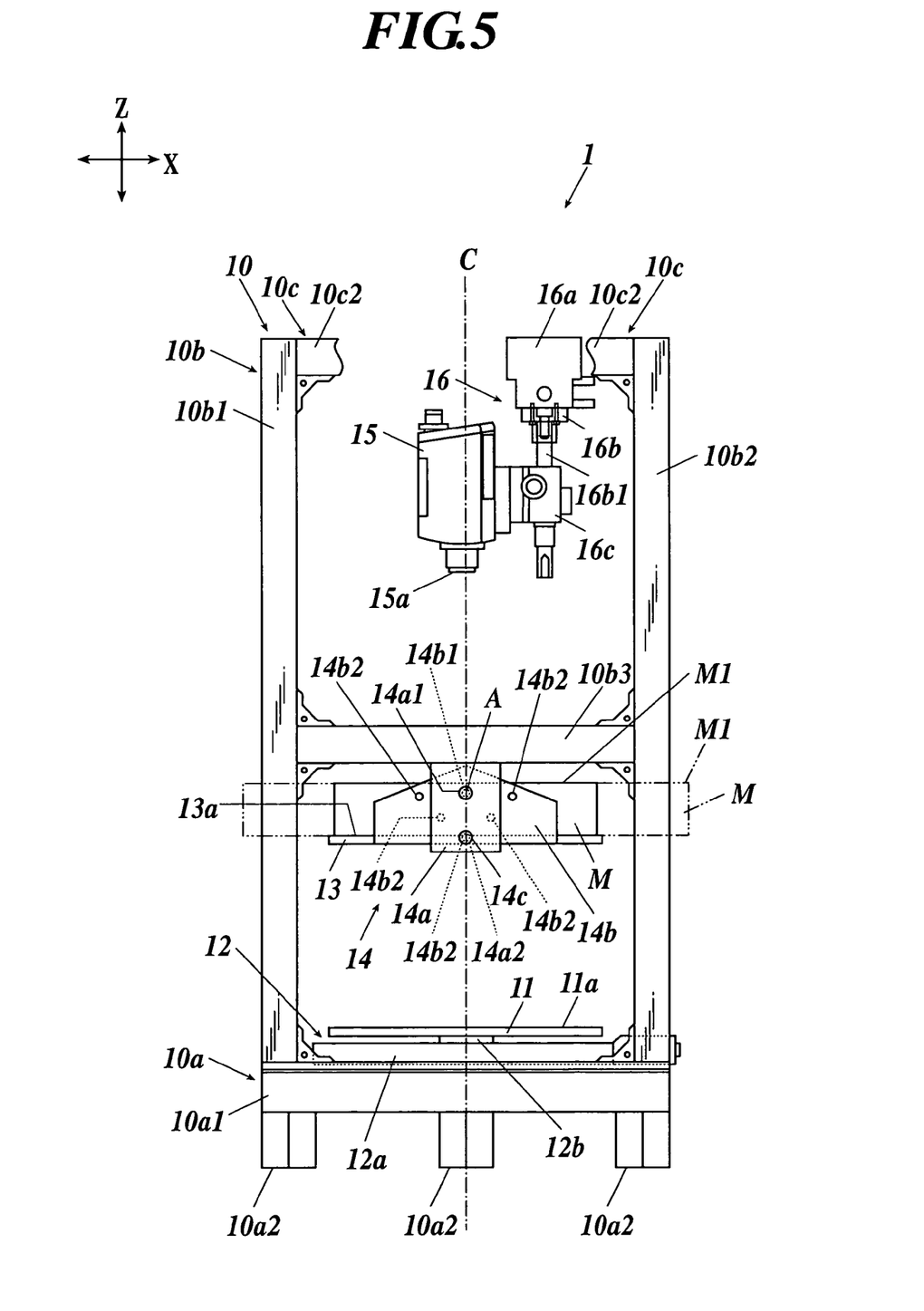
FIG. 5 is a side view (right side view) illustrating the liquid crystal module placed on the second placement unit of the brightness measurement apparatus (liquid crystal module brightness measurement apparatus) according to the present invention.
Figure 6:
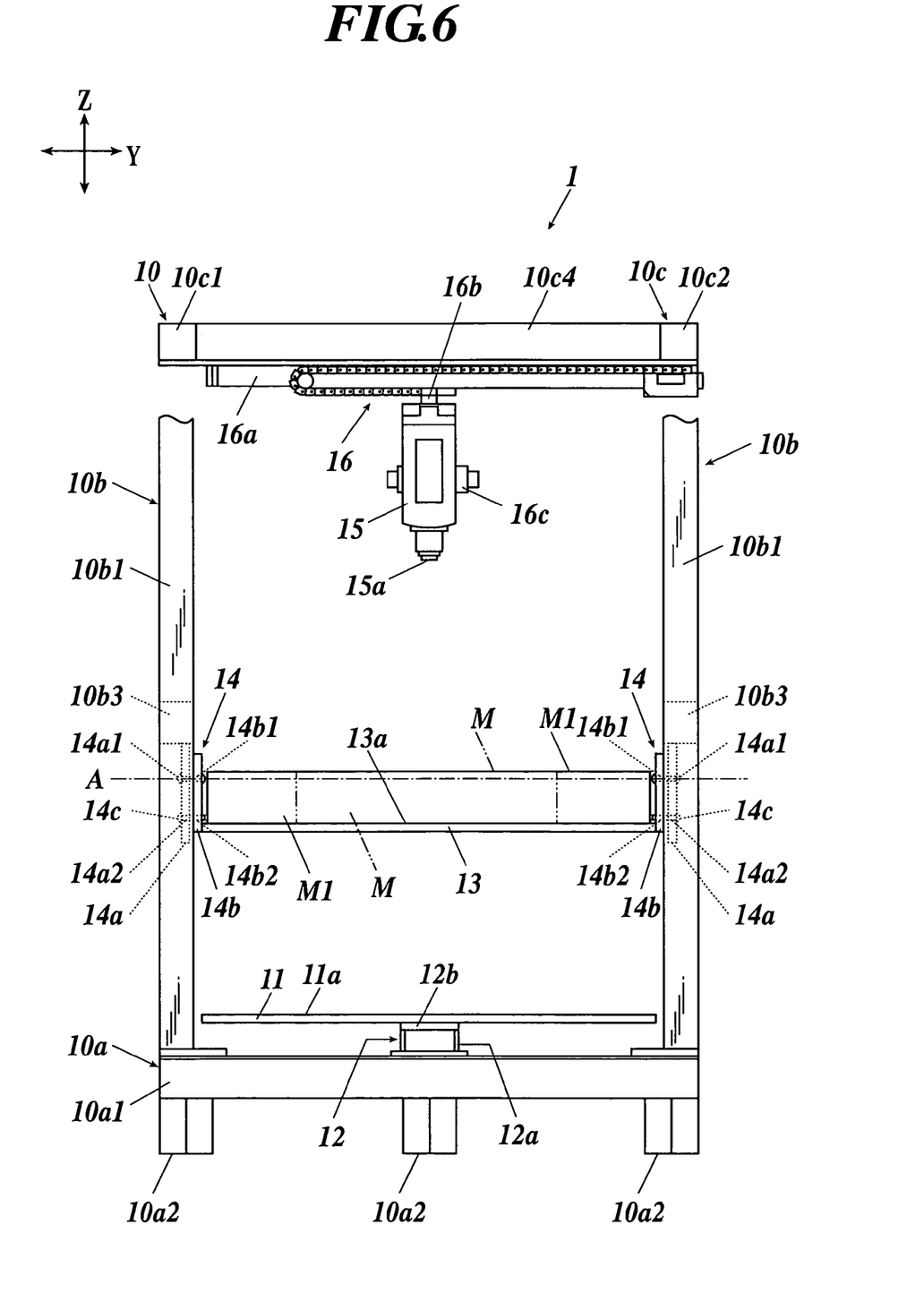
FIG. 6 is a front view illustrating the liquid crystal module placed on the second placement unit of the brightness measurement apparatus (liquid crystal module brightness measurement apparatus) according to the present invention.

Here, for example, as shown in FIG. 6, the predetermined axis A is in the same direction as the y-axis direction and, for example, as shown in FIG. 5, is located at the center C of the x-axis of the measurement body 1.

The placement unit moving mechanism 12, the measurement unit 15, and the measurement unit moving mechanism 16 are controlled by a control unit 61 (after mentioned) of the control processing unit 6 as shown in FIG. 1, for example.

Figure 3:
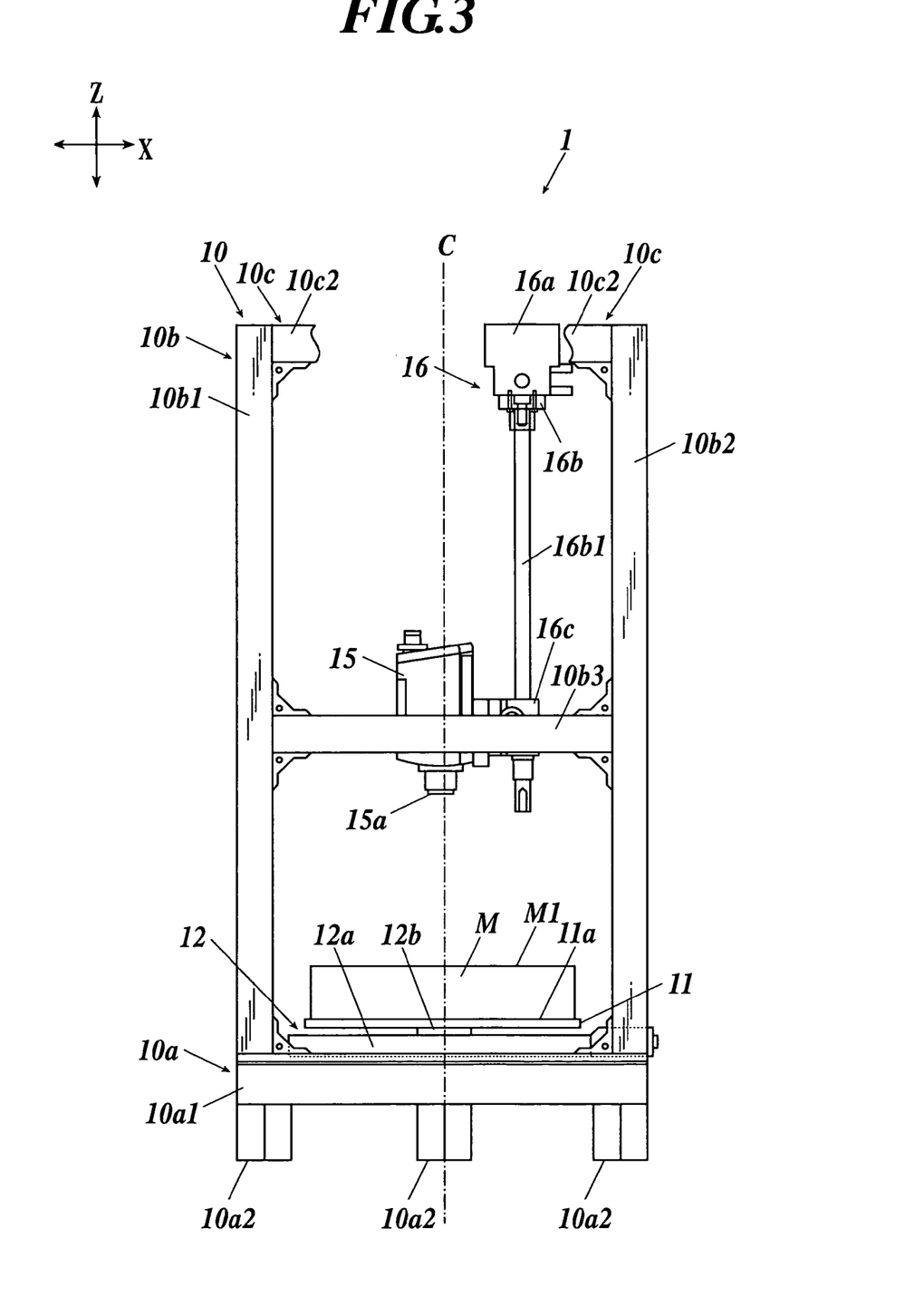
FIG. 3 is a side view (right side view) illustrating a liquid crystal module placed on the first placement unit of the brightness measurement apparatus (liquid crystal module brightness measurement apparatus) according to the present invention.
Figure 4:
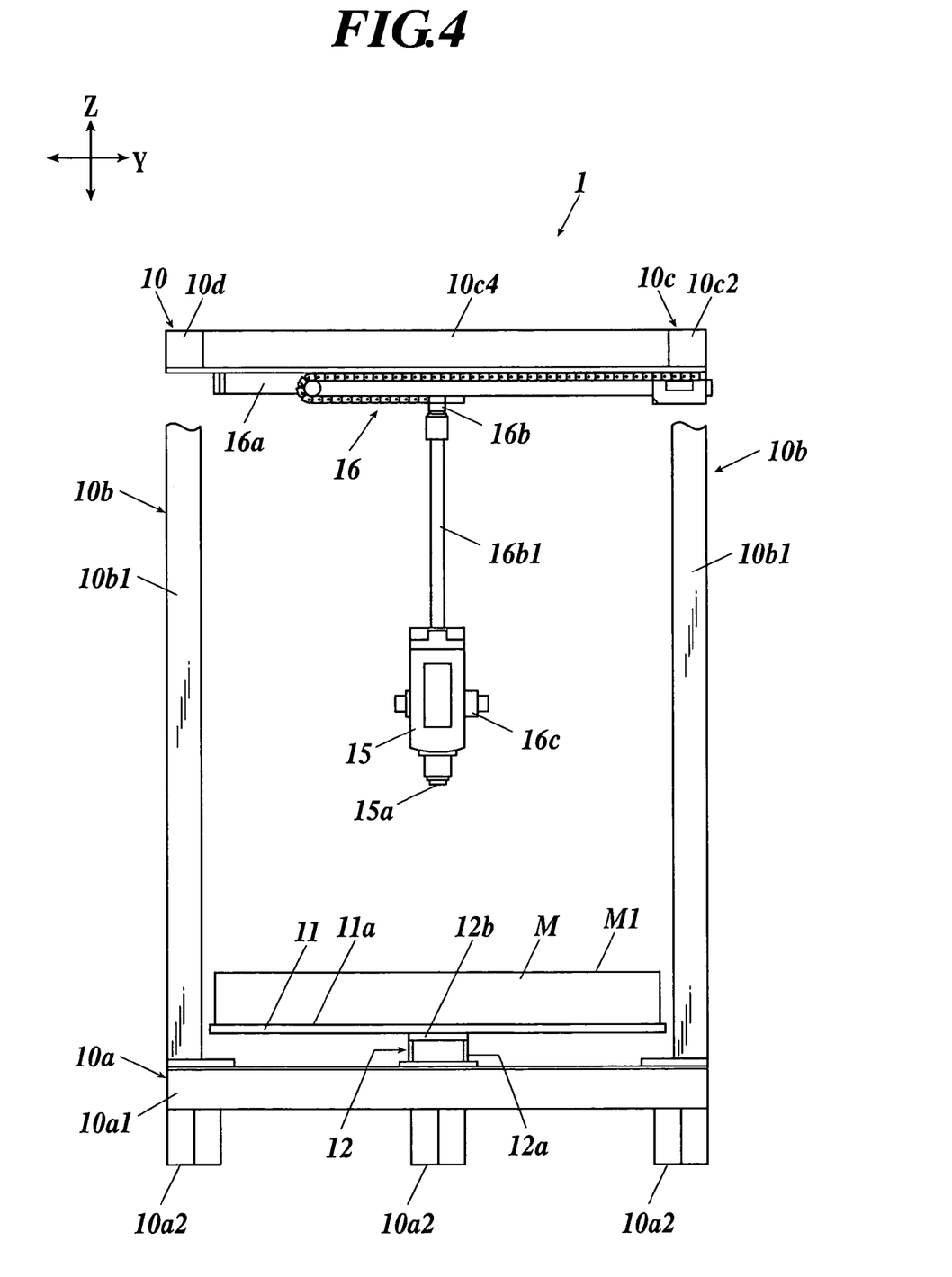
FIG. 4 is a front view illustrating the liquid crystal module placed on the first placement unit of the brightness measurement apparatus (liquid crystal module brightness measurement apparatus) according to the present invention.

The second placement unit 13 and the placement unit rotating mechanism 14 are removeably provided in the measurement body 1, for example. Specifically, for example, FIGS. 2 to 4 illustrate the measurement body 1 from which the second placement unit 13 and the placement unit rotating mechanism 14 are removed. FIGS. 5 and 6 illustrate the measurement body 1 having the second placement unit 13 and the placement unit rotating mechanism 14 attached.

As shown in FIGS. 2 to 6, for example, the frame 10 comprises a lower stand 10a positioned at a lower part of the measurement body 1, side frames 10b fixed to the lower stand 10a so as to be positioned at side parts at both ends in the y-axis direction of the measurement body 1, and an upper frame 10c fixed to the side frames 10b so as to be positioned at an upper part of the measurement body 1.

The lower stand 10a comprises, for example, a lower stand member 10a1 as a plate-like member, and a plurality of leg members 10a2 for supporting the lower stand member 10a1 at the lower surface thereof.

The side frame 10b comprises, for example, side frame members 10b1 and 10b2 disposed along the z-axis direction, a side frame member 10b3 disposed along the x-axis direction, and the like. The side frame 10b has a substantially H-like shape.

The upper frame 10c comprises, for example, upper frame members 10c1 and 10c2 disposed along the x-axis direction, upper frame members 10c3 and 10c4 disposed along the y-axis direction, and the like. The upper frame 10c has a substantially hollow square shape.

As shown in FIGS. 2 to 6, for example, the first placement unit 11 is a plate-like member and the placement surface 11a has a substantially rectangular shape.

The shorter side direction of the placement surface 11a of the first placement unit 11 is, for example, in the same direction as the x-axis direction of the measurement body 1. The longer side direction of the placement surface 11a of the first placement unit 11 is, for example, in the same direction as the y-axis direction of the measurement body 1.

As shown in FIGS. 2 to 4, for example, the liquid crystal module M is placed on the first placement unit 11. Specifically, for example, the liquid crystal module M is placed on the first placement unit 11 so that the display surface M1 thereof faces upward in the z-axis direction and the shorter side direction of the liquid crystal module M is in the same direction as the shorter side direction (x-axis direction) of the placement surface 11a of the first placement unit 11, and so that the longer side direction of the liquid crystal module M is in the same direction as the longer side direction (y-axis direction) of the placement surface 11a of the first placement unit 11.

The placement unit moving mechanism 12 makes the first placement unit 11 move back and forth in the shorter side direction (x-axis direction), for example.

As shown in FIGS. 2 to 6, for example, the placement unit moving mechanism 12 supports the first placement unit 11 and move the first placement unit 11 back and forth in the x-axis direction by a motor (omitted from the drawings) driven in accordance with a control signal from the control unit 61 of the control processing unit 6 (after mentioned).

Specifically, the placement unit moving mechanism 12 comprises, for example, a rail 12a and a placement unit moving unit 12b, and the like.

The rail 12a, for example, is fixed to the near the center of the y-axis of the measurement body 1 on the lower stand member 10a1 of the lower stand 10a so that the lower surface extends along the x-axis direction.

The placement unit moving unit 12b, for example, fixes and supports the first placement unit 11, and is supported by the rail 12a so that the placement unit moving unit 12b can reciprocate along the rail 12a in the x-axis direction.

As long as the placement unit moving mechanism 12 can allow the first placement unit 11 to move back and forth in the x-axis direction, the placement unit moving mechanism 12 may be in any structure, and any method may be used for moving the first placement unit 11 by the placement unit moving mechanism 12.

As shown in FIGS. 5 and 6, for example, the second placement unit 13 is a plate-like member and the placement surface 13a has a substantially rectangular shape.

When the placement surface 13a of the second placement unit 13 is horizontal, the shorter side direction of the placement surface 13a of the second placement surface 13 is, for example, in the same direction as the x-axis direction of the measurement body 1. The longer side direction of the placement surface 13a of the second placement unit 13 is, for example, in the same direction as the y-axis direction of the measurement body 1.

The liquid crystal module M is placed on the second placement unit 13, for example. The placed liquid crystal module M is removeably fixed to the second placement unit 13. Specifically, when the placement surface 13a of the second placement unit 13 is horizontal, the liquid crystal module M is placed on the second placement unit 13 so that the display surface M1 of the liquid crystal module M surfaces upward in the z-axis direction, for example.

The shorter side direction and the longer side direction of the liquid crystal module M placed on the second placement unit 13 may be arbitrary. Specifically, in FIGS. 5 and 6, for example, the liquid crystal module M shown in a solid line is placed so that the shorter side direction is in the same direction as the x-axis direction, and the liquid crystal module M shown in a chain double-dashed line is placed so that the longer side direction is in the same direction as the x-axis direction.

The second placement unit 13, for example, is rotated about the predetermined axis A by the placement unit rotating mechanism 14.

As shown in FIGS. 5 and 6, for example, the placement unit rotating mechanism 14 supports the second placement unit 13 and causes the second placement unit 13 to rotate about the predetermined axis A.

Specifically, the placement unit rotating mechanism 14 comprises, for example, support units 14a, rotation units 14b, and pins 14c, and the like.

The support unit 14a, for example, is detachably fixed to the side frame member 10b3. The support unit 14a, for example, has a support tool 14a1 functioning as a shaft for rotatably supporting the rotation unit 14b and a reference hole 14a2 disposed at a predetermined position.

The rotation unit 14b, for example, fixes the second placement unit 13 at each end in the longer side direction (y-axis direction) of the second placement unit 13. The rotation unit 14b is also supported by the supporting part 14a1 in the support unit 14a so that the rotation unit 14b can be rotated about the predetermined axis A with the second placement unit 13 attached. The rotation unit 14b, for example, has a penetration hole 14b1 through which the supporting part 14a1 in the support unit 14a penetrates along the predetermined axis A, and a plurality of positioning holes 14b2 formed on a circumference around the center of the predetermined axis A (penetration hole 14b1).

Each pin 14c is simultaneously inserted, for example, into any one of the reference holes 14a2 provided in the support units 14a and a plurality of positioning holes 14b2 provided in the rotation unit 14b which are positioned so as to be at the same positions as those of the reference holes 14a2 by the rotation of the rotation unit 14b.

Specifically, the rotation unit 14b is rotated about the predetermined axis A to the desired position with the second placement unit 13 attached, and is fixed by the pins 14c in order to maintain this status.

The measurement unit 15, for example, is a spectroscopic colorimeter (color brightness photometer) or the like that measures the brightness and chromaticity from an upper surface (display surface M1) of the liquid crystal module M placed on the first placement unit 11 or the second placement unit 13.

As shown in FIGS. 2 to 6, for example, the measurement unit moving mechanism 16 supports the measurement unit 15 and causes the measurement unit 15 to move back and forth in the y-axis direction by a motor (omitted from the drawings) driven in accordance with a control signal from a control unit 61 (after mentioned) of the control processing unit 6.

Specifically, the measurement unit moving mechanism 16 comprises, for example, a rail 16a, a measurement unit moving unit 16b, a measurement unit holder 16c, and the like.

Both ends of the rails 16a are, for example, fixed to the upper frame members 10c1 and 10c2 of the upper frame 10c so that the rail 16a extends along the y-axis direction.

The measurement unit moving 16b, for example, has a shaft 16b1 in which the measurement unit holder 16c supporting the measurement unit 15 is attached at the lower end thereof, fixes and supports the measurement unit 15 through the shaft 16b1 and the measurement unit holder 16c, and is supported by the rail 16a so as to move back and forth along the rail 16a in the y-axis direction.

The measurement unit holder 16c, for example, supports the measurement unit 15 and is fixed to the shaft 16b1 in the measurement unit moving unit 16b.

The measurement moving mechanism 16 supports the measurement unit 15, so that a measurement opening 15a of the measurement unit 15 faces downward in the z-axis direction and the center of the measurement opening 15a of the measurement unit 15 is at a center C of the x-axis of the measurement body 1.

The measurement unit holder 16c is vertically adjustable with respect to the shaft 16b1 in the measurement unit moving unit 16b. The shaft 16b1 is exchangeable with the one having a shorter or longer length. By changing the length of the shaft 16b1, the measurement unit 15 can be adjustable into a preferable position. Specifically, when the brightness and chromaticity of the liquid crystal module M placed on the first placement unit 11 is measured, the shaft 16b1 has a longer length as shown in FIGS. 3 and 4, for example. When the brightness and chromaticity of the liquid crystal module M placed on the second placement unit 13 is measured, the shaft 16b1 has a shorter length as shown in FIGS. 5 and 6, for example.

The measurement unit moving mechanism 16 may have any structure and any method for moving the measurement unit 15 by the measurement unit moving mechanism 16, if the measurement unit moving mechanism 16 can move the measurement unit 15 back and forth in the y-axis direction.

A movable range of the first placement unit 11 caused by the placement unit moving mechanism 12 may be arbitrary, as long as the measurement unit 15 can measure the brightness and chromaticity of the range covering, for example, at least from one end of the shorter side direction to the other end of the shorter side direction of the liquid crystal module M placed on the first placement unit 11.

The second placement unit 13, for example, may be rotated in any angle by the placement unit rotating mechanism 14.

A movable range of the measurement unit 15 caused by the measurement unit moving mechanism 16 may be arbitrary, as long as, for example, the measurement unit 15 can measure the brightness and chromaticity of at least a range from one end in the longer side direction to the other end in the longer side direction of the liquid crystal module M placed on the first placement unit 11, or the measurement unit 15 can measure the brightness and chromaticity of at least a range from one end in the longer side direction to the other end in the longer side direction of the liquid crystal module M placed on the second placement unit 13 so that the longer side direction is in the x-axis direction.

When the brightness and chromaticity of the display surface M1 is desired to be measured in a direction orthogonal to the upper surface (display surface M1) of the liquid crystal module M, the liquid crystal module M is placed on the first placement unit 11. In this case, the second placement unit 13 and the placement unit rotating mechanism 14 are detached from the measurement body 1.

On the other hand, when the brightness and chromaticity of the display surface M1 is desired to be measured in a direction oblique to the upper surface (display surface M1) of the liquid crystal module M, the liquid crystal module M is placed on the second placement unit 13.

<Configuration of Control Processing Unit>

As shown in FIG. 1, for example, the control processing unit 6 comprises the control unit 61, an input unit 62, display unit 63, and the like.

As shown in FIG. 1, for example, the control unit 61 controls the placement unit moving mechanism 12, the measurement unit 15, and the measurement unit moving mechanism 16 of the measurement body 1, and processes data obtained by the measurement unit 15.

Specifically, the control unit 61 comprises, for example, a central processing unit (CPU) 611, random access memory (RAM) 612, memory unit 613, and the like.

The CPU 611 performs various types of control operations based on various types of processing programs for the control processing unit 6 of the brightness measurement apparatus 100 stored in the memory unit 613.

The RAM 612 includes a program storage region for expanding a processing program executed by the CPU 611 and a data storage surface for storing inputted data and a processing result arise when executing the processing program.

The memory unit 613 stores a system program that can be executed by the control processing unit 6 of the brightness measurement apparatus 100, various types of processing programs that can be executed by the system program, data used for executing these various types of processing programs, data for a processing result of a calculation processing by the CPU 611, and the like. The program is stored in the memory unit 613 in the form of computer-readable program codes.

Specifically, as shown in FIG. 1, for example, the memory unit 613 stores brightness measurement programs 6131, or the like.

The brightness measurement program 6131, for example, makes the CPU 611 have a function to move the first placement unit 11 in the x-axis direction by the placement unit moving mechanism 12, a function to move the measurement unit 15 in the y-axis direction by the measurement unit moving mechanism 16, a function to make the measurement unit 15 measure the brightness, chromaticity, and the like of the liquid crystal module M placed on the first placement unit 11 or the second placement unit 13, and the like.

Specifically, for example, when the CPU 611 is instructed to measure the brightness, chromaticity, and the like of the liquid crystal module M placed on the first placement unit 11 by an operation by a user of the input unit 62, the CPU 611 moves the first placement unit 11 in the x-axis direction by the placement unit moving mechanism 12, and moves the measurement unit 15 in the y-axis direction by the measurement unit moving mechanism 16, so that the brightness, chromaticity, and the like of the liquid crystal module M placed on the first placement unit 11 is measured by the measurement unit 15.

In this case, the operation is controlled by appropriately combining the movement in the x-axis direction and the movement in the y-axis direction so that entire region specified by the range to be inspected in the x-axis direction and in the y-axis direction previously inputted through the input unit 62 is covered.

On the other hand, for example, when the CPU 61 is instructed to measure the brightness, chromaticity, or the like of the liquid crystal module M placed on the second placement unit 13 by an operation of the input unit 62 by a user, the CPU 61 moves the measurement unit 15 in the y-axis direction by the measurement unit moving mechanism 16, so that the measurement unit 15 can measure the brightness, chromaticity, and the like of the liquid crystal module M placed on the second placement unit 13.

The input unit 62 comprises, for example, a cursor key, alphabetic/numeric keys, various function keys and the like, and outputs a pushing signal caused by an operation of key(s) by an operator to the control unit 61. The input unit 62 also may comprise a pointing device such as a mouse, touch panel, or other input apparatuses, as required.

The display unit 63 comprises, for example, a liquid crystal display (LCD) panel and the like, and performs a predetermined process based on a display signal inputted from the control unit 61.

The brightness measurement apparatus 100 of the present invention as described above comprises the first placement unit 11 and the second placement unit 13 on which the liquid crystal module M is placed, and the measurement unit 15 for measuring the brightness, chromaticity, and the like from the upper surface (display surface M1) of the liquid crystal module M placed on the first placement unit 11 or the second placement unit 13. The placement unit moving mechanism 12 can move the first placement unit 11 in the x-axis direction along the placement surface 11a of the first placement unit 11 (shorter side direction of upper surface of measurement body 1, shorter side direction of placement surface 11a). The measurement unit moving mechanism 16 can move the measurement unit 15 in the y-axis direction along the placement surface 11a of the first placement unit 11 that is orthogonal to the x-axis direction (longer side direction of upper surface of measurement body 1, longer side direction of placement surface 11a) The liquid crystal module M is placed on the first placement unit 11 so that the shorter side direction of the liquid crystal module M is in the x-axis direction and the longer side direction of the liquid crystal module M is in the y-axis direction.

Specifically, the brightness, chromaticity, and the like of the entire upper surface of the liquid crystal module M (display surface M1) placed on the first placement unit 11 can be measured only by moving the liquid crystal module M placed on the first placement unit 11 in one direction (shorter side direction of liquid crystal module M) and by moving the measurement unit 15 in one direction (longer side direction of liquid crystal module M). Therefore, the liquid crystal module M as well as the measurement unit 15 is moved only in one direction. Thus, it is possible to alleviate increase in the setting area and the cost associated with the increase in size of a display apparatus such as a liquid crystal display. Furthermore, the liquid crystal module M placed on the first placement unit 11 is moved along the shorter side direction of the liquid crystal module M. Therefore, when compared with a case where moving along the longer side direction of the liquid crystal module M, a moving range of the liquid crystal module M can be reduced. Thus, the increase of the setting area associated with increase in size of a display apparatus such as a liquid crystal display can be alleviated.

Furthermore, the placement unit rotating mechanism 14 can rotate the second placement unit 13 about the predetermined axis A. Thus, the brightness, chromaticity, and the like of the liquid crystal module M can be measured not only in a direction orthogonal to the upper surface (display surface M1) of the liquid crystal module M placed on the second placement unit 13, but also in a direction oblique to the upper surface of the liquid crystal module M. This can provide various measurements. Furthermore, the liquid crystal module M placed on the second placement unit 13 only rotate about the predetermined axis A in the y-axis direction along the placement surface 13*a* of the second placement unit 13. Thus, increase in the setting area of the brightness measurement apparatus 1 can be alleviated even when including the placement surface 13*a* of the second placement unit 13.

The present invention is not limited to the above-described embodiments, and can be modified as needed without departing from the scope of the invention.

Although, in the above description, the liquid crystal module M has been described as an object to be measured, the other object can also be measured as long as an object is a component that constitutes a display apparatus such as a liquid crystal display, plasma display, or the like, and for which the brightness, chromaticity, and the like must be measured for a quality inspection or quality control purpose. Accordingly, the object such as a backlight constituting a liquid crystal display, a plasma module constituting a plasma display, or the like can also be measured.

In the above Embodiment, the liquid crystal module M is placed on the first placement unit 11 so that the display surface M1 of the liquid crystal module M faces upward in the z-axis direction, the shorter side direction of the liquid crystal module M is in the shorter side direction of the placement surface 11*a* of the first placement unit 11, and the longer side direction of the liquid crystal module M is in the longer side direction of the placement surface 11*a* of the first placement unit 11. However, the liquid crystal module M may be placed in any manner as long as at least the display surface M1 of the liquid crystal module M faces upward in the z-axis direction.

Although in the Embodiment, the first placement unit 11 is moved in the x-axis direction automatically (specifically, by the placement unit moving mechanism 12 controlled by the CPU 611 executing the brightness measurement program 6131). However, the first placement unit 11 may be manually moved in the x-axis direction, for example.

Similarly, the measurement unit 15 may be manually moved in the y-axis direction, for example.

Further, in the Embodiment the second placement unit 13 is manually rotated about the predetermined axis A, the second placement unit 13 may be automatically rotated about the predetermined axis A, for example.

The entire disclosure of Japanese Patent Application No. Tokugan 2005-342366 filed on Nov. 28, 2005 including specification, claims, drawings and summary are incorporated herein by reference in its entirety.

What is claimed is:

1. A liquid crystal module brightness measurement apparatus, comprising:
   a first placement unit and a second placement unit on which a liquid crystal module is placed,
   a measurement unit for measuring brightness and chromaticity from an upper surface of the liquid crystal module placed on the first placement unit or the second placement unit,
   a placement unit moving mechanism for moving the first placement unit in an x-axis direction,
   a placement unit rotating mechanism for rotating the second placement unit about a predetermined axis, and
   a measurement unit moving mechanism for moving the measurement unit in a y-axis direction orthogonal to the x-axis direction, wherein
   the x-axis direction is in same direction as a shorter side direction of the liquid crystal module placed on the first placement unit,
   the y-axis direction is in same direction as a longer side direction of the liquid crystal module placed on the first placement unit, and
   the predetermined axis is an axis extending along a placement surface of the second placement unit.

* * * * *